United States Patent

[11] 3,588,811

| [72] | Inventor | Alfred Donald Prickett<br>Handsworth Wood, England |
|---|---|---|
| [21] | Appl. No. | 720,520 |
| [22] | Filed | Apr. 11, 1968 |
| [45] | Patented | June 28, 1971 |
| [73] | Assignee | Joseph Lucas (Industries) Limited<br>Birmingham, England |
| [32] | Priority | May 3, 1967 |
| [33] | | Great Britain |
| [31] | | 20560/67 |

[54] WARNING DEVICE FOR USE WITH SEATBELTS
1 Claim, 1 Drawing Fig.

[52] U.S. Cl. .................................................. 340/52,
340/380
[51] Int. Cl. ...................................................... B60g 1/00

[50] Field of Search........................................... 340/52, 52
(ED), 278, 380; 307/10

[56] References Cited
UNITED STATES PATENTS
3,384,885  5/1968  Forbush ...................... 340/52X
FOREIGN PATENTS
723,793  8/1942  Germany...................... 340/380

*Primary Examiner*—Alvin H. Waring
*Attorney*—Holman & Stern

ABSTRACT: When a seatbelt on a road vehicle is fastened, the ends of two optical cables associated with the two parts of the seatbelt are aligned, and light passes through one of the cables into the other cable and thence to a warning device to indicate that the belt is properly fastened.

Patented June 28, 1971
3,588,811
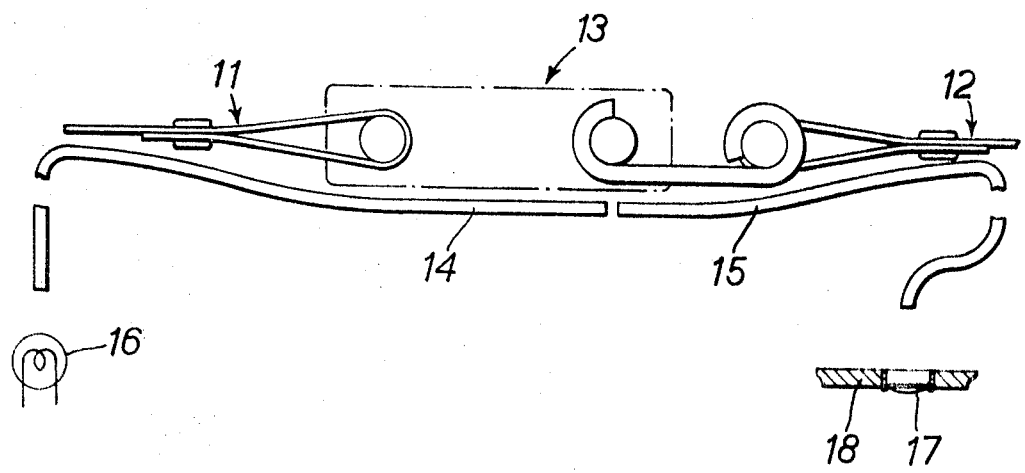
INVENTOR
A. S. Prickett
BY Glascock, Downing &
Seaboldt ATTORNEYS

WARNING DEVICE FOR USE WITH SEATBELTS

This invention relates to a warning device for use with seatbelts in road vehicles, to give a driver or other passenger of the vehicle, an indication that his or her seatbelt is properly fastened.

A device in accordance with the invention includes optical cables associated with the two parts of the seatbelt respectively, and having ends which are arranged to be aligned when the seatbelt is properly fastened, a light source for transmitting light into one of the optical cables, and warning means associated with the other optical cable for giving the required warning.

By optical cable is meant a cable consisting of one or more optical fibers, the cable having the property that it can transmit light between its ends irrespective of the attitude of the cable, in much the same way that an electric cable transmits electricity.

The accompanying drawing is a part-sectional side view illustrating one example of the invention.

Referring to the drawing, two parts of a seatbelt are shown at 11 and 12, with the interengaging buckle at 13. Associated with the parts 11, 12 are a pair of optical cables 14, 15 which can conveniently be woven into the seatbelts, the cables 14, 15 having their ends secured to the two parts of the buckle in any convenient manner (not shown), so that as shown, the two ends of the cable are aligned and in closely spaced relationship when the seatbelt is correctly fastened. The cable 14 is associated with any convenient light source 16, which can be a warning lamp already existing on the vehicle, and the other cable 15 transmits light to the warning device, which conveniently is a lens 17 in the dashboard 18. Where two or more seatbelts are provided with the warning device, a common light source can be used for transmitting light to the belts respectively.

In a modification, the aligned ends of the cables 14, 15 are provided with lenses for directing light from one cable to the other.

I claim:

1. A warning device for use with seat belts in road vehicles, including optical cables associated with the two parts of the seatbelt respectively, and having ends which are arranged to be aligned when the seatbelt is properly fastened, a light source for transmitting light into one of the optical cables, and warning means associated with the other optional cable for giving the require warning.